(12) United States Patent
Uchida et al.

(10) Patent No.: US 9,623,882 B2
(45) Date of Patent: Apr. 18, 2017

(54) CARBODY OF RAILCAR

(71) Applicant: KAWASAKI JUKOGYO KABUSHIKI KAISHA, Kobe-shi, Hyogo (JP)

(72) Inventors: Kei Uchida, Kobe (JP); Seiichiro Yagi, Kobe (JP); Eiichi Kato, Kobe (JP); Chihiro Okayama, Kobe (JP); Toshiyuki Hirashima, Kobe (JP); Akihiro Tada, Kobe (JP)

(73) Assignee: KAWASAKI JUKOGYO KABUSHIKI KAISHA, Kobe-shi (JP)

(\*) Notice: Subject to any disclaimer, the term of this patent is extended or adjusted under 35 U.S.C. 154(b) by 0 days.

(21) Appl. No.: 14/916,503

(22) PCT Filed: Sep. 4, 2013

(86) PCT No.: PCT/JP2013/005221
§ 371 (c)(1),
(2) Date: Mar. 3, 2016

(87) PCT Pub. No.: WO2015/033372
PCT Pub. Date: Mar. 12, 2015

(65) Prior Publication Data
US 2016/0221588 A1   Aug. 4, 2016

(51) Int. Cl.
*B61D 17/04* (2006.01)
*B61D 19/00* (2006.01)
(Continued)

(52) U.S. Cl.
CPC ............. *B61D 19/00* (2013.01); *B61D 17/04* (2013.01); *B61D 17/08* (2013.01); *B61D 17/10* (2013.01); *B61D 17/12* (2013.01)

(58) Field of Classification Search
CPC ...... B61D 17/00; B61D 17/005; B61D 17/02; B61D 17/04; B61D 17/041; B61D 17/043;
(Continued)

(56) References Cited

U.S. PATENT DOCUMENTS 5,797,646 A   8/1998   Jeunehomme et al.

FOREIGN PATENT DOCUMENTS

| CN | 101032966 A | | 9/2007 | |
|---|---|---|---|---|
| EP | 1353832 | \* | 1/2002 | ............. B61D 17/04 |

(Continued)

OTHER PUBLICATIONS

Nov. 19, 2013 International Search Report issued in International Patent Application No. PCT/JP2013/005221.
(Continued)

*Primary Examiner* — R. J. McCarry, Jr.
(74) *Attorney, Agent, or Firm* — Oliff PLC

(57) ABSTRACT

A plurality of side modules include a first module, a second module and a third module extending between the first module and the second module in the carbody longitudinal direction and joined to the first module and the second module. A lower end portion of the first module and a lower end portion of the second module oppose and are joined to a floor bodyshell. A lower end portion of a region of the third module opposes the floor bodyshell, the region being located between the first module and the second module. The lower end portion of the region of the third module is freer with respect to the floor bodyshell than the lower end portion of the first module and the lower end portion of the second module. The third module is supported by the floor bodyshell through the first module and the second module.

16 Claims, 9 Drawing Sheets

CARBODY LONGITUDINAL DIRECTION

(51) Int. Cl.
  *B61D 17/08* (2006.01)
  *B61D 17/10* (2006.01)
  *B61D 17/12* (2006.01)

(58) Field of Classification Search
  CPC .... B61D 17/045; B61D 17/046; B61D 17/08;
  B61D 17/10
  See application file for complete search history.

(56) References Cited

FOREIGN PATENT DOCUMENTS

| | | |
|---|---|---|
| EP | 1353832 B1 | 12/2007 |
| JP | 2007-161084 A | 6/2007 |

OTHER PUBLICATIONS

Mar. 8, 2016 International Preliminary Report on Patentability issued in International Patent Application No. PCT/JP2013/005221.
Dec. 19, 2016 Office Action issued in Chinese Patent Application No. 2013800789622.

\* cited by examiner

CARBODY OF RAILCAR

TECHNICAL FIELD

The present invention relates to a carbody of a railcar, the carbody including a side bodyshell divided into a plurality of side modules in a carbody longitudinal direction.

BACKGROUND ART

When producing a bodyshell of a railcar, typically, metal panels are joined to one another by welding. However, since the metal panel is easily distorted by the welding, a high degree of welding skill is required. In addition, since the welding is accompanied by electricity and heat, the metal panel to which fittings are attached in advance cannot be subjected to the welding. Here, proposed is a module construction method of coupling a plurality of side modules to one another by fastening members or the like to assemble a side bodyshell, each of the side modules being produced in advance to have a predetermined configuration (see PTLs 1 and 2, for example).

CITATION LIST

Patent Literature

PTL 1: European Patent No. 1353832
PTL 2: U.S. Pat. No. 5,797,646

SUMMARY OF INVENTION

Technical Problem

When modularizing the side bodyshell, reducing the individual sizes of the side modules facilitates the conveyance of the side modules to an assembly factory for carbodies. In work of attaching the side modules when assembling the carbody, the side modules are individually joined to a floor bodyshell and a roof bodyshell in consideration of the rigidity of the carbody and the like. Therefore, a large amount of joining work is required while positioning the individual side modules relative to the floor bodyshell and the roof bodyshell. Thus, assembly work becomes a burden.

An object of the present invention is to improve the efficiency of the assembly work of the carbody while maintaining the rigidity of the carbody, the assembly work being performed by joining the side modules to one another.

Solution to Problem

A carbody of a railcar according to the present invention includes: a first bodyshell constituted by a side bodyshell divided into a plurality of side modules in a carbody longitudinal direction; and a second bodyshell constituted by a floor bodyshell or a roof bodyshell, an end portion of the side bodyshell being joined to the second bodyshell, the end portion being located at one side in a vertical direction, the plurality of side modules including a first module, a second module provided away from the first module in the carbody longitudinal direction, and a third module extending between the first module and the second module in the carbody longitudinal direction and joined to the first module and the second module, an end portion of the first module and an end portion of the second module opposing and being joined to the second bodyshell, the end portions of the first and second modules being located at the one side, an end portion of a region of the third module opposing the second bodyshell, the region being located between the first module and the second module in a side view, the end portion of the region being located at the one side, the end portion of the region of the third module being freer with respect to the second bodyshell than the end portion of the first module and the end portion of the second module, and the third module being supported by the second bodyshell through the first module and the second module.

According to the above configuration, when joining an end portion (located at one side in a vertical direction; a lower end portion or an upper end portion) of the first bodyshell to the second bodyshell, the end portion of the first module and the end portion of the second module provided away from the first module in the carbody longitudinal direction are mainly joined to the second bodyshell. With this, the amount of joining (such as a length of joining and the number of joined portions) of the first bodyshell to the second bodyshell can be reduced. Thus, the efficiency of the assembly work of the carbody is improved. In addition, even though the second module is provided away from the first module in the carbody longitudinal direction, the first and second modules are coupled to each other in the carbody longitudinal direction by the third module. Therefore, the high rigidity of the carbody can be realized.

Advantageous Effects of Invention

As is clear from the above explanation, the present invention can improve the efficiency of the assembly work of the carbody while maintaining the rigidity of the carbody, the assembly work being performed by joining the side modules to one another.

DESCRIPTION OF EMBODIMENTS

Hereinafter, embodiments will be explained in reference to the drawings.

First Embodiment

Figure 1:
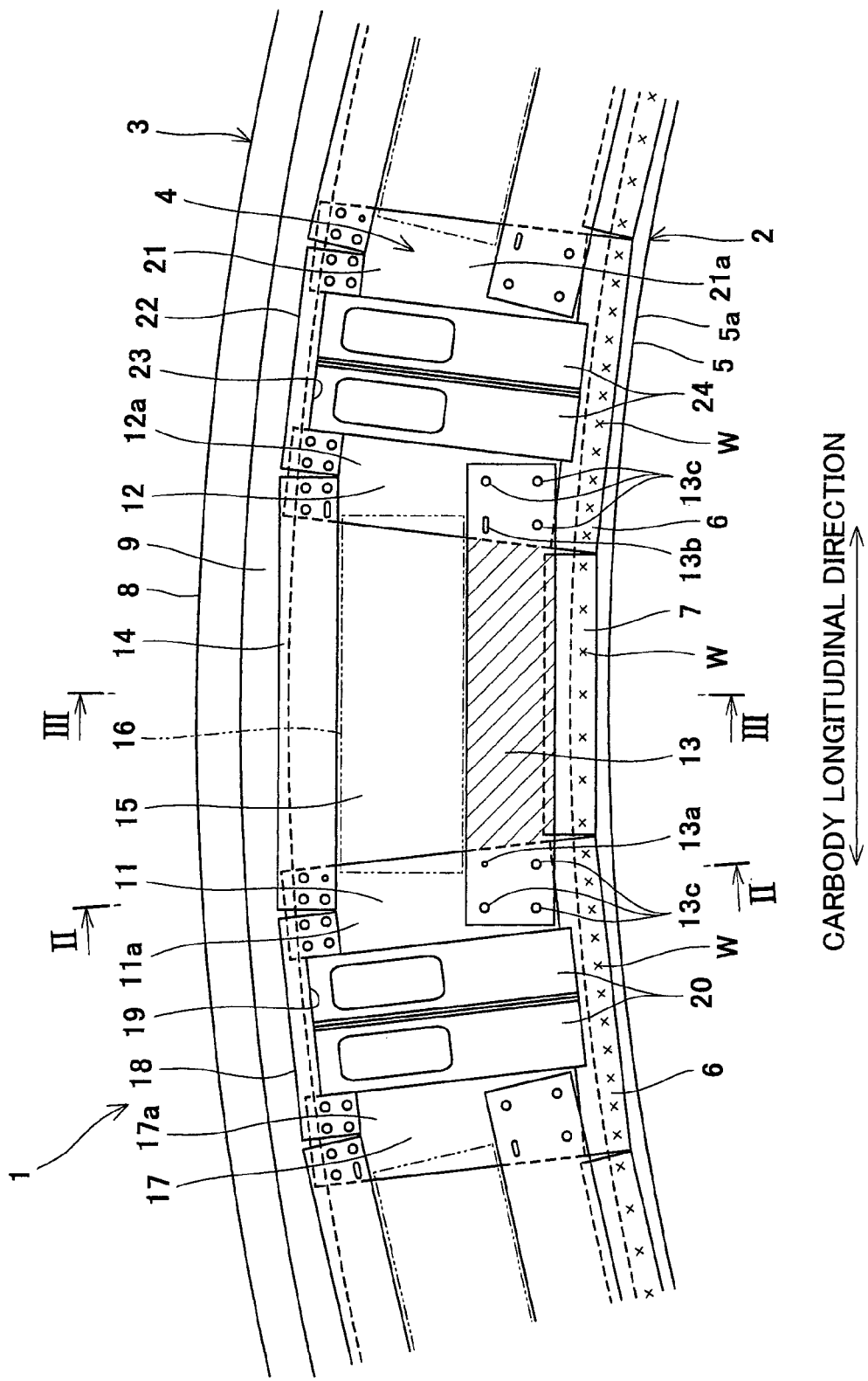
FIG. 1 is a side view schematically showing a carbody of a railcar according to a first embodiment.

FIG. 1 is a side view schematically showing a carbody of a railcar according to the first embodiment. As shown in FIG. 1, a carbody 1 of the railcar includes a floor bodyshell 2 (second bodyshell), a roof bodyshell 3 (second bodyshell), and a side bodyshell 4 (first bodyshell) connecting a carbody width direction end portion of the floor bodyshell 2 with a carbody width direction end portion of the roof bodyshell 3. An end bodyshell (not shown) is connected to end portions of the floor bodyshell 2, the roof bodyshell 3, and the side bodyshell 4 in a carbody longitudinal direction. The floor bodyshell 2 includes: an underframe 5 having a side sill 5a (longitudinal member) located at one carbody width direction side of the floor bodyshell 2 and extending in the carbody longitudinal direction; a plurality of door opening brackets 6 fixed to the side sill 5a; and a plurality of cover plates 7 fixed to the side sill 5a and extending along lower end portions of below-described wainscot panel modules 13.

The door opening brackets 6 and the cover plates 7 are serially provided along a longitudinal direction of the side sill 5a and are fixed to a side surface of the side sill 5a by welding W (such as spot welding or laser welding). When focusing on each of the door opening brackets 6 and the cover plates 7, welded portions where the door opening bracket 6 or the cover plate 7 is welded to the side sill 5a from a lateral side are located on a virtual straight line extending along the longitudinal direction of the side sill 5a in a side view. The side sill 5a includes: a horizontal wall portion; an upper vertical wall portion projecting upward from a carbody inside end portion of the horizontal wall portion; and a lower vertical wall portion projecting downward from a carbody outside end portion of the horizontal wall portion. Each of the door opening brackets 6 and the cover plates 7 also includes: a horizontal wall portion; an upper vertical wall portion projecting upward from a carbody inside end portion of the horizontal wall portion; and a lower vertical wall portion projecting downward from a carbody outside end portion of the horizontal wall portion. The lower vertical wall portions of the door opening brackets 6 and the lower vertical wall portions of the cover plates 7 are fixed to the side sill 5a by the welding W. Upper ends of the door opening brackets 6 and upper ends of the cover plates 7 are located above an upper end of the side sill 5a. The horizontal wall portions of the door opening brackets 6 and the horizontal wall portions of the cover plates 7 are spaced apart from the horizontal wall portion of the side sill 5a in a vertical direction.

The roof bodyshell 3 includes: a roof main body 8; and a cantrail 9 (longitudinal member) fixed to a carbody width direction end portion of the roof main body 8 and extending in the carbody longitudinal direction. The side sill 5a is made of metal such as stainless steel, and the cantrail 9 is made of metal such as aluminum alloy. Each of the side sill 5a and the cantrail 9 is a long member integrally extending from one side of the carbody 1 to the other side in the carbody longitudinal direction. Each of the floor bodyshell 2 and the roof bodyshell 3 is formed to have a circular-arc shape that is convex upward in a side view. To be specific, the floor bodyshell 2 and the roof bodyshell 3 are cambered in consideration that after the carbody 1 is assembled, a middle portion of the carbody 1 in the carbody longitudinal direction bends downward by an own weight of the carbody 1.

The side bodyshell 4 includes: a window opening 15; a first door opening 19 provided at one side (left side in FIG. 1) of the window opening 15 in the carbody longitudinal direction; and a second door opening 23 provided at the other side (right side in FIG. 1) of the window opening 15 in the carbody longitudinal direction. The side bodyshell 4 is divided into a plurality of side modules 11 to 14, 17, 18, 21, and 22 in the carbody longitudinal direction. Each of the side modules 11 to 14, 17, 18, 21, and 22 includes at least a panel-shaped portion. The side bodyshell 4 includes first to fourth door pocket modules 11, 12, 17, and 21, the wainscot panel module 13, a window modesty panel module 14, and door modesty panel modules 18 and 22.

The first to fourth door pocket modules 11, 12, 17, and 21 are higher in strength than the wainscot panel module 13 and the modesty panel modules 14, 18, and 22. Especially, bending strength of each of the first to fourth door pocket modules 11, 12, 17, and 21 in a carbody width direction (i.e., strength with respect to bending by which upper and lower end portions of each of the first to fourth door pocket modules 11, 12, 17, and 21 are displaced in the carbody width direction) is higher than bending strength of each of the wainscot panel module 13 and the modesty panel modules 14, 18, and 22. Each of the first to fourth door pocket modules 11, 12, 17, and 21 is formed by a plate that is thicker than each of the wainscot panel module 13 and the modesty panel modules 14, 18, and 22.

The first door pocket module 11 includes a first door pocket 11a capable of housing a door 20 that is a sliding door configured to open and close the first door opening 19. A lower end portion and upper end portion of the first door pocket module 11 are joined to the floor bodyshell 2 and the roof bodyshell 3, respectively. The second door pocket module 12 includes a second door pocket 12a capable of housing a door 24 that is a sliding door configured to open and close the second door opening 23. A lower end portion and upper end portion of the second door pocket module 12 are joined to the floor bodyshell 2 and the roof bodyshell 3, respectively.

The second door pocket module 12 is spaced apart from the first door pocket module 11 in the carbody longitudinal direction, and the window opening 15 (opening portion) is formed between the first door pocket module 11 and the second door pocket module 12. To be specific, the first door pocket module 11 is provided between the first door opening 19 and the window opening 15, and the second door pocket module 12 is provided between the second door opening 23 and the window opening 15. The first door pocket module 11 is provided at one side (right side in FIG. 1) of the first door opening 19 in the carbody longitudinal direction so as to define the first door opening 19, and the second door pocket module 12 is provided at one side (left side in FIG. 1) of the second door opening 23 in the carbody longitudinal direction so as to define the second door opening 23, the one side of the second door opening 23 being opposite to the one side of the first door opening 19 in the carbody longitudinal direction.

The wainscot panel module 13 extends between the first door pocket module 11 and the second door pocket module 12 in the carbody longitudinal direction, and both respective sides of the wainscot panel module 13 in the carbody longitudinal direction are joined to the first door pocket module 11 and the second door pocket module 12. A length of the wainscot panel module 13 in the carbody longitudinal direction is longer than each of a length of the first door pocket module 11 and a length of the second door pocket module 12. The wainscot panel module 13 is located under the window opening 15, and an upper side of the wainscot panel module 13 defines a bottom side of the window opening 15. Among the modules constituting the side bodyshell 4, the wainscot panel module 13 is a member closest to the floor bodyshell 2 in a region immediately under the window opening 15.

A lower end portion of a region (portion shown by hatching in FIG. 1) of the wainscot panel module 13 opposes the cover plate 7 of the floor bodyshell 2, the region being located between the first door pocket module 11 and the second door pocket module 12 in a side view. In addition, the lower end portion of the region of the wainscot panel module 13 is freer with respect to the floor bodyshell 2 than the lower end portion of the first door pocket module 11 and the lower end portion of the second door pocket module 12. In other words, the lower end portion of the region (portion shown by hatching in FIG. 1), located between the first door pocket module 11 and the second door pocket module 12 in a side view, of the wainscot panel module 13 is higher in allowance of displacement relative to the floor bodyshell 2 at the time of bending deformation of the carbody 1 than the lower end portion of the first door pocket module 11 and the lower end portion of the second door pocket module 12. More specifically, in the present embodiment, the lower end portion of the region, located between the first door pocket module 11 and the second door pocket module 12 in a side view, of the wainscot panel module 13 is not joined to the cover plate 7, that is, is in a non-joined state with respect to the floor bodyshell 2. To be specific, the wainscot panel module 13 is supported by the floor bodyshell 2 through the first door pocket module 11 and the second door pocket module 12.

One small hole 13a and a plurality of large holes 13c for fixation are formed at a portion of the wainscot panel module 13, the portion overlapping the first door pocket module 11. An elongated hole 13b and a plurality of large holes 13c for fixation are formed at a portion of the wainscot panel module 13, the portion overlapping the second door pocket module 12. Fastening members (such as bolts or rivets) are inserted into these holes 13a to 13d for fixation. Thus, the wainscot panel module 13 is fixed to the first door pocket module 11 and the second door pocket module 12. At this time, by inserting the fastening member into the small hole 13a and inserting the fastening member into the elongated hole 13b that is horizontally long, the wainscot panel module 13 is positioned in the vertical direction, and the bottom side of the window opening 15 is defined. Then, the fastening members are inserted into the large holes 13c that are unloaded holes. Thus, fastening work is facilitated.

The window modesty panel module 14 extends between the first door pocket module 11 and the second door pocket module 12 in the carbody longitudinal direction, and both respective sides of the window modesty panel module 14 in the carbody longitudinal direction are joined to the first door pocket module 11 and the second door pocket module 12. A length of the window modesty panel module 14 in the carbody longitudinal direction is longer than each of the length of the first door pocket module 11 and the length of the second door pocket module 12. A method of joining the window modesty panel module 14 to the first door pocket module 11 and the second door pocket module 12 is the same as a method of joining the wainscot panel module 13 to the first door pocket module 11 and the second door pocket module 12. The window modesty panel module 14 is located above the window opening 15, and a lower side of the window modesty panel module 14 defines an upper side of the window opening 15. Among the modules constituting the side bodyshell 4, the window modesty panel module 14 is a member closest to the roof bodyshell 3 in a region immediately above the window opening 15.

An upper end portion of a region of the window modesty panel module 14 opposes the cantrail 9 of the roof bodyshell 3, the region being located between the first door pocket module 11 and the second door pocket module 12 in a side view. In addition, the upper end portion of the region of the window modesty panel module 14 is freer with respect to the roof bodyshell 3 than the upper end portion of the first door pocket module 11 and the upper end portion of the second door pocket module 12. In the present embodiment, the upper end portion of the region, located between the first door pocket module 11 and the second door pocket module 12 in a side view, of the window modesty panel module 14 is in a non-joined state with respect to the cantrail 9 of the roof bodyshell 3. Therefore, the window modesty panel module 14 is supported by the roof bodyshell 3 through the first door pocket module 11 and the second door pocket module 12.

A rectangular space surrounded by the first door pocket module 11, the second door pocket module 12, the wainscot panel module 13, and the window modesty panel module 14 is the window opening 15. The window opening 15 is covered with a transparent window plate 16, and respective end portions of the window plate 16 are adhered to the first door pocket module 11 and the second door pocket module 12.

The third door pocket module 17 is provided at the other side (left side in FIG. 1) of the first door opening 19 in the carbody longitudinal direction so as to sandwich the first door opening 19 together with the first door pocket module 11 in the carbody longitudinal direction and define the first door opening 19. The third door pocket module 17 includes a third door pocket 17a capable of housing the door 20 that is a sliding door configured to open and close the first door opening 19. A lower end portion and upper end portion of the third door pocket module 17 are joined to the floor bodyshell 2 and the roof bodyshell 3, respectively. The lower end portion of the first door pocket module 11 and the lower end portion of the third door pocket module 17 are joined to the door opening bracket 6 by the fastening members (such as bolts or rivets). A plurality of fixing holes 6a (see FIG. 2) are formed on the door opening bracket 6 as joint portions to which the first door pocket module 11 and the third door pocket module 17 are joined.

As the door opening bracket 6, a portion joined to the first door pocket module 11 and a portion joined to the third door pocket module 17 are integrally formed by one plate. When focusing on each of the first door pocket module 11 and the third door pocket module 17, fastened portions where the first door pocket module 11 or the third door pocket module 17 is fastened to the door opening bracket 6 are located on a virtual straight line extending along the longitudinal direction of the side sill 5a in a side view. In the present embodiment, when focusing on one door opening bracket 6, the fixing holes 6a are located on a virtual straight line extending along the longitudinal direction of the side sill 5a in a side view.

The upper end portion of the first door pocket module 11 and the upper end portion of the third door pocket module 17 are joined to the door modesty panel module 18 by the fastening members (such as bolts or rivets). As the door modesty panel module 18, a portion joined to the first door pocket module 11 and a portion joined to the third door pocket module 17 are integrally formed by one plate. A length of the door modesty panel module 18 in the carbody longitudinal direction is longer than each of the length of the first door pocket module 11 and a length of the third door pocket module 17. The door modesty panel module 18 is in a non-joined state with respect to the roof bodyshell 3. A rectangular space surrounded by the first door pocket module 11, the third door pocket module 17, the door opening brackets 6, and the door modesty panel module 18 is the door opening 19.

The fourth door pocket module 21 is provided at one side (right side in FIG. 1) of the second door opening 21 in the carbody longitudinal direction so as to sandwich the first door opening 23 together with the second door pocket module 12 in the carbody longitudinal direction and define the second door opening 21. The fourth door pocket module 21 includes a fourth door pocket 21a capable of housing the door 24 that is a sliding door configured to open and close the second door opening 23. A lower end portion and upper end portion of the fourth door pocket module 21 are joined to the floor bodyshell 2 and the roof bodyshell 3, respectively. The lower end portion of the second door pocket module 12 and the lower end portion of the fourth door pocket module 21 are joined to the door opening bracket 6 by the fastening members (such as bolts or rivets).

Figure 2:
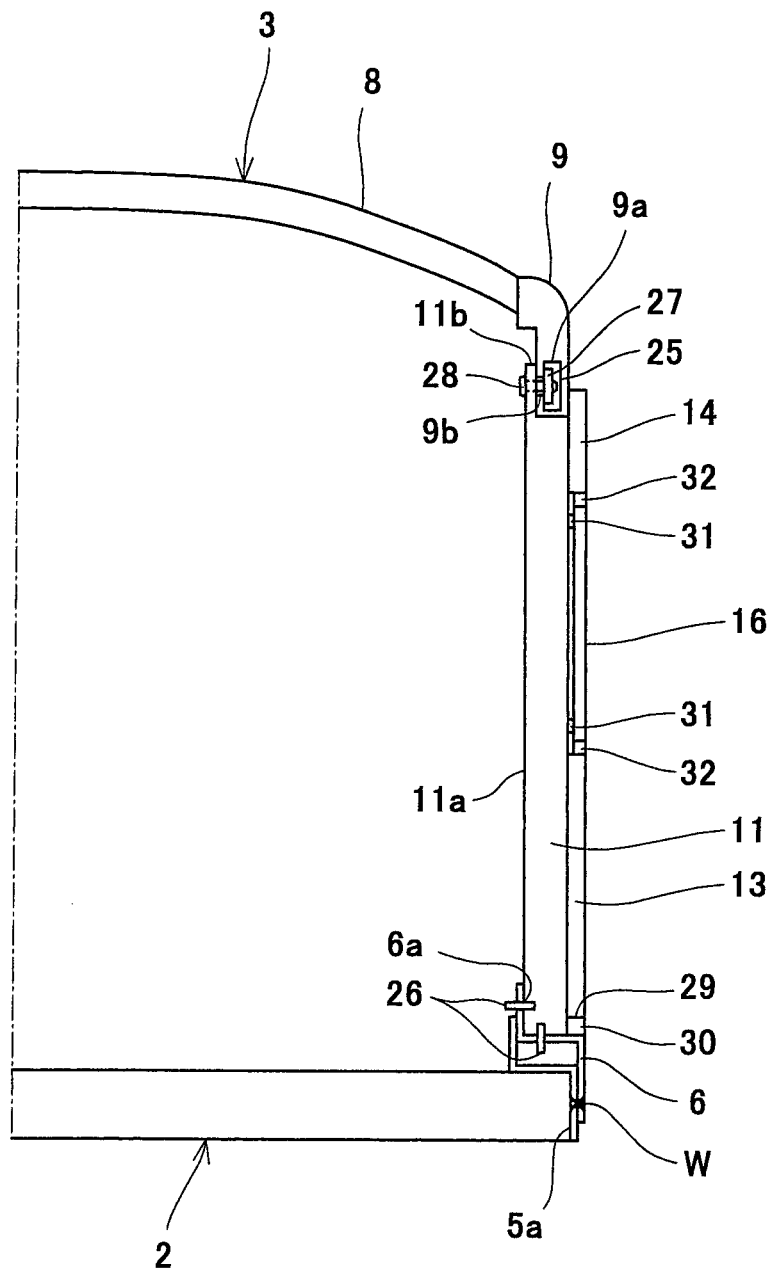
FIG. 2 is a cross-sectional view taken along line II-II of FIG. 1.

FIG. 2 is a cross-sectional view taken along line II-II of FIG. 1. Configurations of joining the first to fourth door pocket modules 11, 12, 17, and 21 to the floor bodyshell 2, the roof bodyshell 3, and the like are the same as one another. Therefore, the configuration of joining the first door pocket module 11 to the floor bodyshell 2, the roof bodyshell 3, and the like will be explained as an example. As shown in FIG. 2, the door opening bracket 6 is fixed to the side sill 5a by the welding W, and the first door pocket module 11 is placed on the horizontal wall portion of the door opening bracket 6 from above and contacts the upper vertical wall portion of the door opening bracket 6 from a carbody exterior side. The first door pocket module 11 is fastened and fixed to the door opening bracket 6 from a carbody interior side (lateral side) and a lower side by fastening members 26 (such as bolts or rivets) inserted through the fixing holes 6a. The first door pocket module 11 includes the first door pocket 11a and an attachment plate portion 11b provided at an upper side of the first door pocket 11a. A plurality of fastening holes are formed on the attachment plate portion 11b so as to be spaced apart from one another in the carbody longitudinal direction.

The cantrail 9 is longer than each of the modules 11 to 14, 17, 18, 21, and 22 in the carbody longitudinal direction. A groove portion 9a is formed on a carbody width direction inner side surface of the cantrail 9. The groove portion 9a is a groove portion extending in the carbody longitudinal direction and used to fix the attachment plate portions 11b (upper end portions) of the first to fourth door pocket modules 11, 12, 17, and 21. The groove portion 9a is formed by extrusion.

The groove portion 9a includes: an internal space 25 into which a coupling seat 27 is inserted; and a slit 9b extending in the carbody longitudinal direction of the groove portion 9a so as to open toward the attachment plate portion 11b. The coupling seat 27 is inserted into the internal space 25 of the groove portion 9a so as to be slidable in the carbody longitudinal direction. A vertical width of the slit 9b is smaller than each of a vertical width of the internal space 25 and a vertical width of the coupling seat 27. The attachment plate portion 11b of the first door pocket module 11 is fixed to the coupling seat 27 by a fastening member 28 (such as a bolt or a rivet) through the slit 9b. With this, edge portions located at upper and lower sides of the slit 9b of the cantrail 9 are pressed and sandwiched between the attachment plate portion 11b and the coupling seat 27. Thus, the first door pocket module 11 is joined to the cantrail 9. The vertical width of the slit 9b is larger than a vertical width of a portion (shaft portion) of the fastening member 28, the portion passing through the slit 9b. The coupling seat may be a plate extending in the carbody longitudinal direction and including a plurality of holes formed at predetermined intervals in the carbody longitudinal direction or may be a publicly known washer. When using a bolt as the fastening member 28, the coupling seat may be a member, such as a nut, having an internal thread or a nut plate.

A gap 29 is formed between the lower end portion of the wainscot panel module 13 and the door opening bracket 6, and silicone or the like as a sealing member 30 is put into the gap 29 by coking. The window plate 16 is stacked on an outer surface of the first door pocket module 11 through a spacer 31. The window plate 16 is adhered to the outer surface of the first door pocket module 11 at a position inside the spacer 31. Silicone or the like as a sealing member 32 is put into a gap between a lower end of the window plate 16 and an upper end of the wainscot panel module 13 by coking, and silicone or the like as another sealing member 32 is put into a gap between an upper end of the window plate 16 and a lower end of the window modesty panel module 14 by coking.

Figure 3:
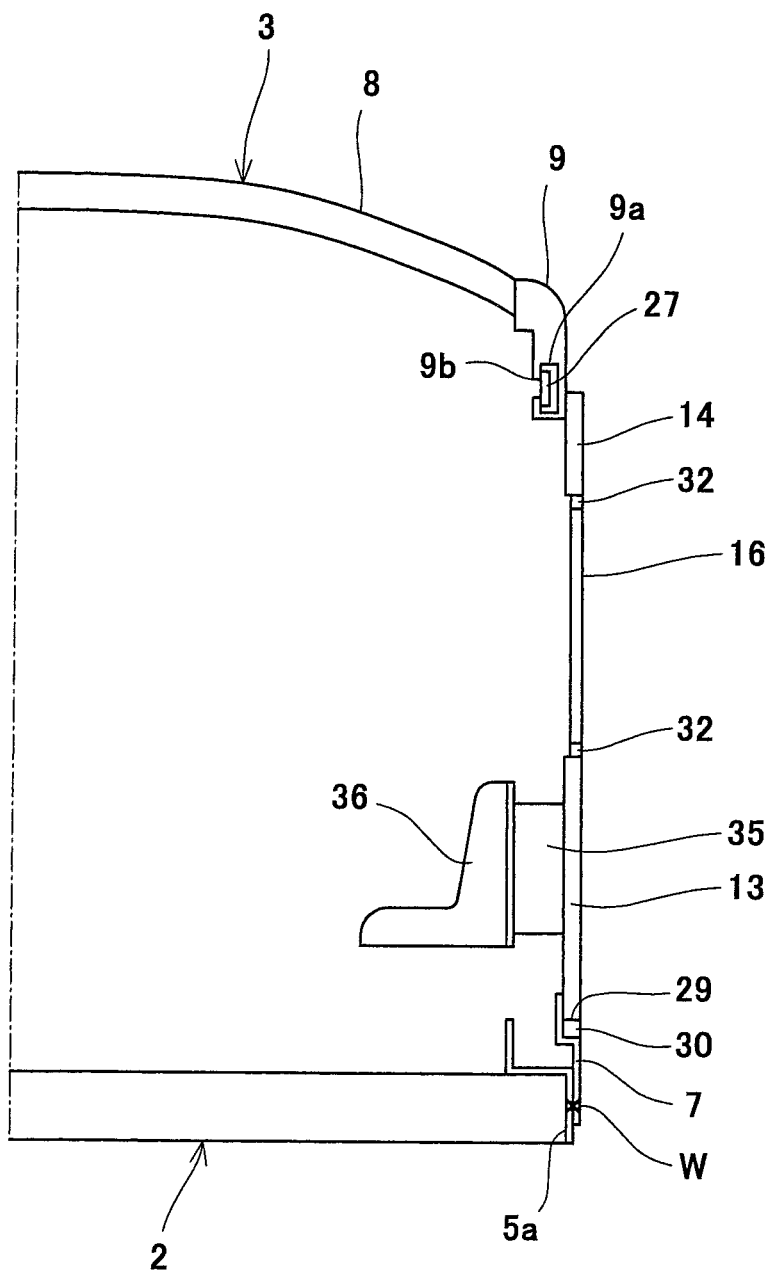
FIG. 3 is a cross-sectional view taken along line of FIG. 1.

FIG. 3 is a cross-sectional view taken along line of FIG. 1. As shown in FIG. 3, the wainscot panel module 13 is not fixed to the cover plate 7 of the floor bodyshell 2. The gap 29 is formed between a lower end of the wainscot panel module 13 and the cover plate 7, and silicone or the like as a sealing member 30 is put into the gap 29 by coking. A receiving member 35 to which a seat member 36 that is an interior part is attached is fixed to the wainscot panel module 13. To be specific, the seat member 36 is integrated with the wainscot panel module 13 through the receiving member 35.

Figure 4:
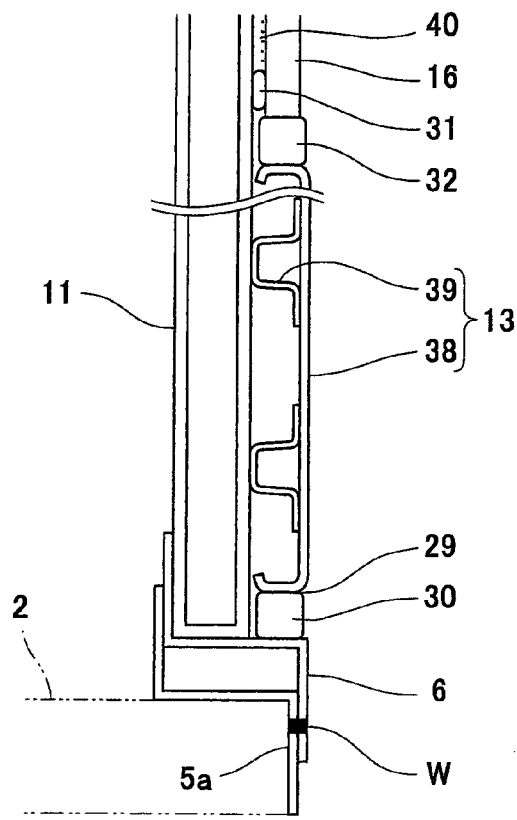
FIG. 4 is an enlarged longitudinal sectional view showing major components of the carbody shown in FIG. 1.

FIG. 4 is an enlarged longitudinal sectional view showing major components of the carbody 1 shown in FIG. 1. As shown in FIG. 4, the wainscot panel module 13 includes a side outside plate 38 and reinforcing members 39 welded to an inner surface of the side outside plate 38. A top portion of each of the reinforcing members 39 of the wainscot panel module 13 contacts the outer surface of the first door pocket module 11. A lower end portion of the side outside plate 38 curves toward an inner side in the carbody width direction to form a flat lower surface, and an upper end portion of the side outside plate 38 also curves toward the inner side in the carbody width direction to form a flat upper surface.

The lower end of the wainscot panel module 13 is located lower than the upper end of the side sill 5a (side portion) of the floor bodyshell 2 and outside the upper end of the side sill 5a in the carbody width direction. Silicone or the like as the sealing member 30 is put into the gap 29 between the lower end portion of the wainscot panel module 13 and the door opening bracket 6 by coking. An outside portion of the window plate 16 is stacked on the outer surface of the first door pocket module 11 through the spacer 31 made of an elastic material, and the window plate 16 is adhered to the outer surface of the first door pocket module 11 by an adhesive 40 at a position inside the spacer 31. Silicone or the like as the sealing member 32 is put into a gap between the lower end of the window plate 16 and the upper end of the wainscot panel module 13 by coking.

According to the configuration explained as above, when joining the lower end portion and upper end portion of the side bodyshell 4 to the floor bodyshell 2 and the roof bodyshell 3, respectively, the lower end portion and upper end portion of each of the first to fourth door pocket modules 11, 12, 17, and 21 are joined to the floor bodyshell 2 and the roof bodyshell 3, respectively, and the wainscot panel module 13 and the modesty panel modules 14, 18, and 22 are in a non-joined state with respect to the floor bodyshell 2 and the roof bodyshell 3. Therefore, the amount of joining (such as a length of the joining or the number of joined portions) of the side bodyshell 4 to each of the floor bodyshell 2 and the roof bodyshell 3 can be reduced. Thus, the efficiency of the assembly work of the carbody is improved. In addition, even though the door pocket modules 11, 12, 17, and 21 are spaced apart from one another in the carbody longitudinal direction, the door pocket modules 11, 12, 17, and 21 are coupled to one another in the carbody longitudinal direction by the wainscot panel module 13 and the modesty panel modules 14, 18, and 22 which are not directly joined to the floor bodyshell 2 and the roof bodyshell 3. This can realize the excellent rigidity of the carbody.

A carbody longitudinal direction range (joining range) where each of the door pocket modules 11, 12, 17, and 21 is joined to the floor bodyshell 2 or the roof bodyshell 3 falls within a range of a carbody longitudinal direction length of each of the door pocket modules 11, 12, 17, and 21, and these joining ranges are short in the carbody longitudinal direction. Therefore, even though each of the floor bodyshell 2 and the roof bodyshell 3 is curved (cambered) in a circular-arc shape in a side view, the joining can be performed easily.

Further, the floor bodyshell 2 includes the door opening brackets 6 including the fixing holes (joint portions) to which the lower end portions of the door pocket modules 11, 12, 17, and 21 are joined. Therefore, the positions of the door pocket modules 11, 12, 17, and 21 are accurately determined. Thus, the door openings 19 and 23 can be accurately formed. The attachment plate portion 11b of each of the door pocket modules 11, 12, 17, and 21 is fastened by the fastening member 28 to the coupling seat 27 which is slidably inserted into the internal space 25 of the groove portion 9a of the cantrail 9. Therefore, position adjustment work in the carbody longitudinal direction is facilitated. To be specific, regarding the work of attaching the door pocket modules 11, 12, 17, and 21, both the improvement of the accuracy of attachment positions and the improvement of the ease of work can be obtained.

In the above-described embodiment, when the first door pocket module 11 is regarded as a "first module", and the second door pocket module 12 is regarded as a "second module", each of the wainscot panel module 13 and the window modesty panel module 14 corresponds to a "third module", and the third door pocket module 17 corresponds to a "fourth module". Further, when the first door pocket module 11 is regarded as the "first module", and the third door pocket module 17 is regarded as the "second module", the door modesty panel module 18 corresponds to a "third module". It should be noted that the interior part itself may serve as the third module.

Second Embodiment

Figure 5:
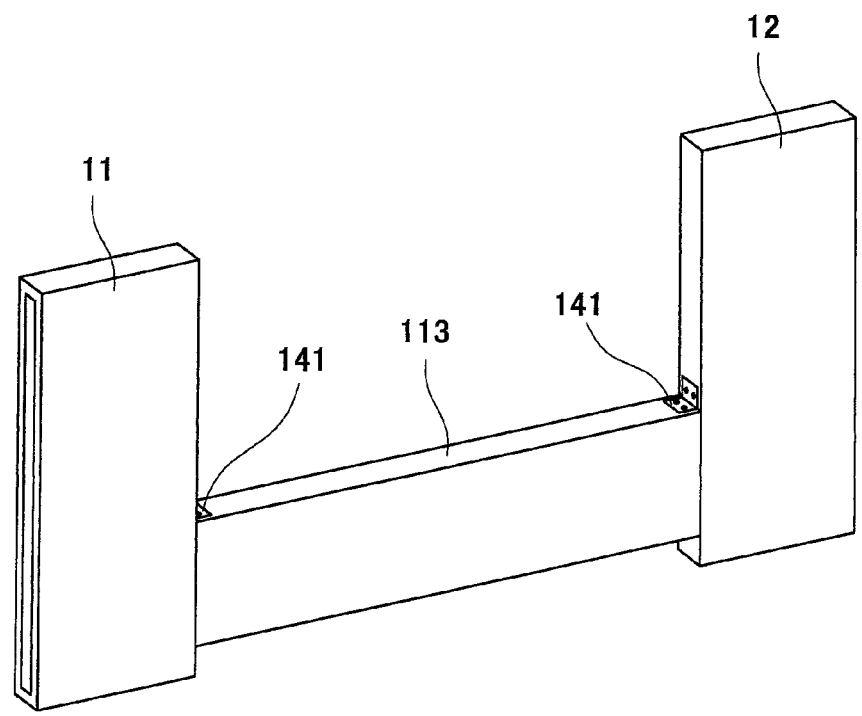
FIG. 5 is a perspective view schematically showing an attaching structure for a wainscot panel module of the carbody according to a second embodiment.

FIG. 5 is a perspective view schematically showing an attaching structure for a wainscot panel module 113 of the carbody according to the second embodiment. As shown in FIG. 5, the wainscot panel module 113 of the second embodiment extends between the first door pocket module 11 and the second door pocket module 12 in the carbody longitudinal direction so as to be sandwiched between the first door pocket module 11 and the second door pocket module 12. Respective car longitudinal direction end surfaces of the wainscot panel module 113 oppose and contact an end surface of the first door pocket module 11 and an end surface of the second door pocket module 12. The wainscot panel module 113 is fastened to the first door pocket module 11 and the second door pocket module 12 through brackets 141 by fastening members. With this, an outer surface of the wainscot panel module 113 can be substantially flush with the outer surface of the first door pocket module 11 and an outer surface of the second door pocket module 12. Since the other configuration of the second embodiment is the same as the configuration of the first embodiment, an explanation thereof is omitted.

Third Embodiment

Figure 6:
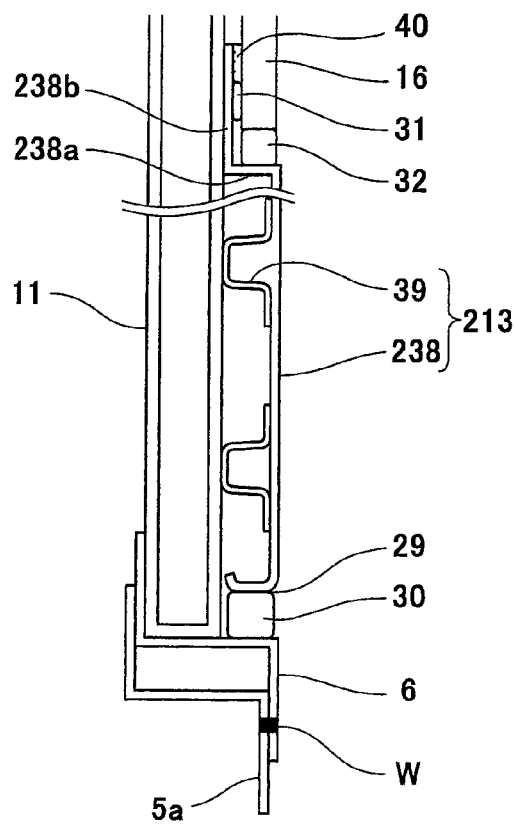
FIG. 6 is an enlarged longitudinal sectional view showing major components of the carbody according to a third embodiment.

FIG. 6 is an enlarged longitudinal sectional view showing major components of the carbody according to the third embodiment. As shown in FIG. 6, in the third embodiment, a step portion 238a which is bent toward the first door pocket module 11 is formed at an upper portion of a side outside plate 238 of a wainscot panel module 213. An upper end portion 238b located at an upper side of the step portion 238a contacts the outer surface of the first door pocket module 11 to extend upward. The window plate 16 is stacked on an outer surface of the upper end portion 238b of the side outside plate 238 through the spacer 31, and the window plate 16 is adhered to the outer surface of the upper end portion 238b by the adhesive 40 at a position inside the spacer 31. Silicone or the like as the sealing member 32 is put into a gap between the lower end of the window plate 16 and the upper surface of the step portion 238b of the side outside plate 238 by coking. Since the other configuration of the third embodiment is the same as the configuration of the first embodiment, an explanation thereof is omitted.

Fourth Embodiment

Figure 7:
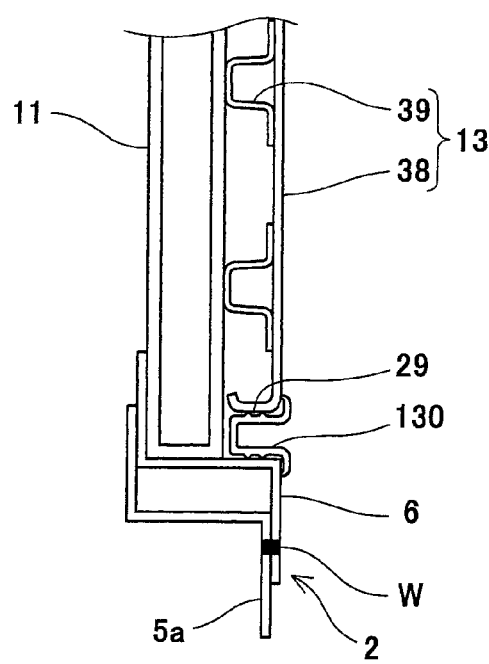
FIG. 7 is an enlarged longitudinal sectional view showing major components of the carbody according to a fourth embodiment.

FIG. 7 is an enlarged longitudinal sectional view showing major components of the carbody according to the fourth embodiment. As shown in FIG. 7, in the fourth embodiment, a sealing member 130 which stops water by elastic biasing force and has a U-shaped cross section is inserted in the gap 29 between the lower end of the wainscot panel module 13 and the floor bodyshell 2 in a closely contact state. Since the other configuration of the fourth embodiment is the same as the configuration of the first embodiment, an explanation thereof is omitted.

Fifth Embodiment

Figure 8:
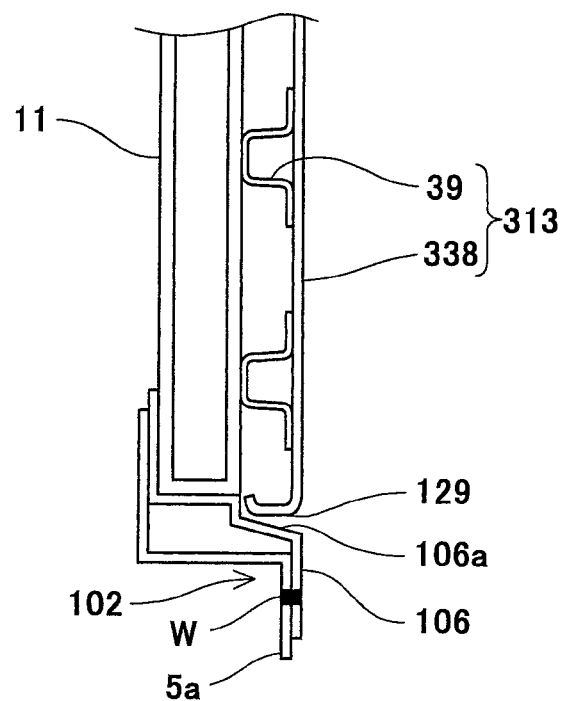
FIG. 8 is an enlarged longitudinal sectional view showing major components of the carbody according to a fifth embodiment.

FIG. 8 is an enlarged longitudinal sectional view showing major components of the carbody according to the fifth embodiment. As shown in FIG. 8, in the fifth embodiment, a lower end of a side outside plate 338 of a wainscot panel module 313 is located lower than an upper end of a side portion of a floor bodyshell 102 (i.e., an upper end of the side sill 5a and an upper end of the door opening bracket 6) and lower than a lower end of the first door pocket module 11. A door opening bracket 106 is provided under a lower end of the wainscot panel module 313 so as to oppose the lower end of the wainscot panel module 313. A slope portion 106a which is inclined downward toward an outer side in the carbody width direction is formed at a portion of the door opening bracket 106, the portion opposing the lower end of the wainscot panel module 313. With this, water which enters into a gap 129 between the wainscot panel module 313 and the door opening bracket 106 is discharged to the outside along the slope portion 106a by an own weight of the water. Since the other configuration of the fifth embodiment is the same as that of the first embodiment, an explanation thereof is omitted.

Sixth Embodiment

Figure 9:
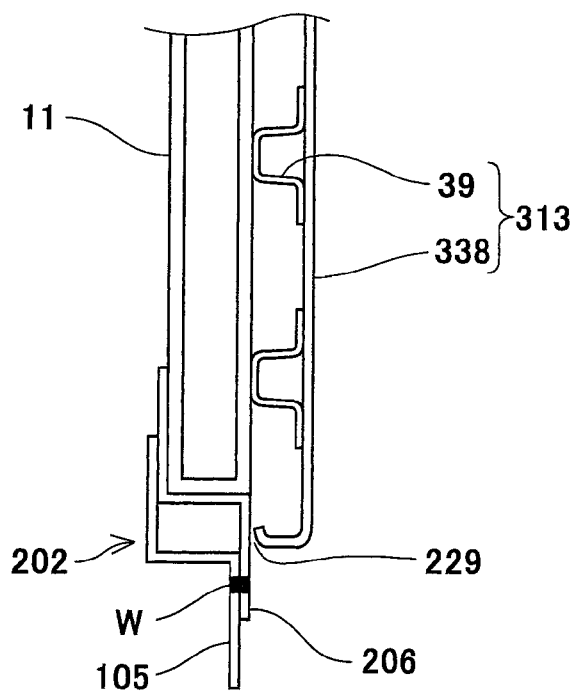
FIG. 9 is an enlarged longitudinal sectional view showing major components of the carbody according to a sixth embodiment.

FIG. 9 is an enlarged longitudinal sectional view showing major components of the carbody according to the sixth embodiment. As shown in FIG. 9, in the sixth embodiment, the lower end of the wainscot panel module 313 is located lower than an upper end of a side portion of a floor bodyshell 202 (i.e., the upper end of the side sill 5a and the upper end of the door opening bracket 6) and lower than the lower end of the first door pocket module 11. The floor bodyshell 202 is not provided immediately under the lower end of the wainscot panel module 313. Therefore, a gap 229 between the lower end portion of the wainscot panel module 313 and the floor bodyshell 202 faces in the vertical direction. Since the other configuration of the sixth embodiment is the same as the configuration of the first embodiment, an explanation thereof is omitted.

Seventh Embodiment

Figure 10:
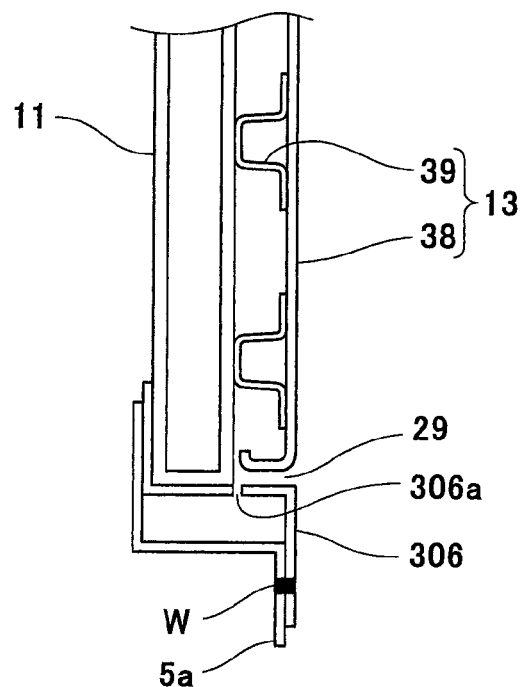
FIG. 10 is an enlarged longitudinal sectional view showing major components of the carbody according to a seventh embodiment.

FIG. 10 is an enlarged longitudinal sectional view showing major components of the carbody according to the seventh embodiment. As shown in FIG. 10, in the seventh embodiment, a drain hole 306a is formed at a door opening bracket 306 so as to be located at a carbody width direction inner side of the gap 29 between the lower end portion of the wainscot panel module 13 and the door opening bracket 306. With this, water which enters through the gap 29 is discharged to the outside through the drain hole 306a. Since the other configuration of the seventh embodiment is the same as the configuration of the first embodiment, an explanation thereof is omitted.

Eighth Embodiment

Figure 11:
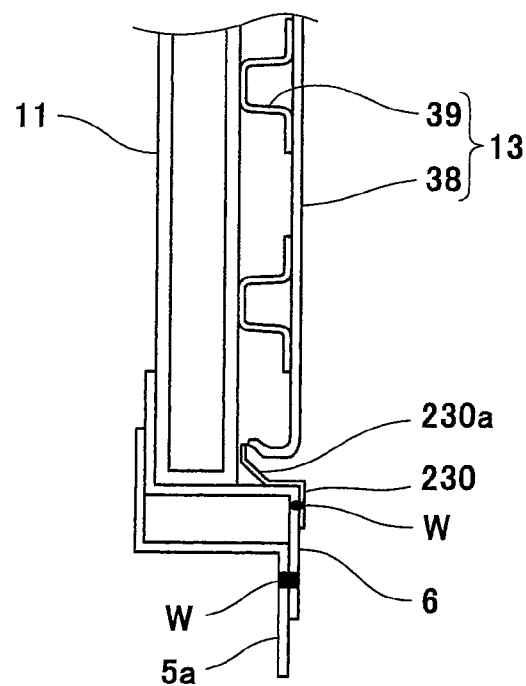
FIG. 11 is an enlarged longitudinal sectional view showing major components of the carbody according to an eighth embodiment.

FIG. 11 is an enlarged longitudinal sectional view showing major components of the carbody according to the eighth embodiment. As shown in FIG. 11, in the eighth embodiment, a slope member 230 as a separate member is joined to an outer surface of the door opening bracket 6 by welding or the like. The slope member 230 is thinner than each of the side sill 5 and the door opening brackets 6. A slope portion 230a which is inclined downward toward an outer side in the carbody width direction is formed at a portion of the slope member 230, the portion opposing the lower end of the wainscot panel module 13. With this, water which enters into the gap between the wainscot panel module 13 and the slope member 230 can be discharged to the outside along the slope portion 230a by an own weight of the water. Since the other configuration of the eighth embodiment is the same as the configuration of the first embodiment, an explanation thereof is omitted.

Ninth Embodiment

Figure 12:
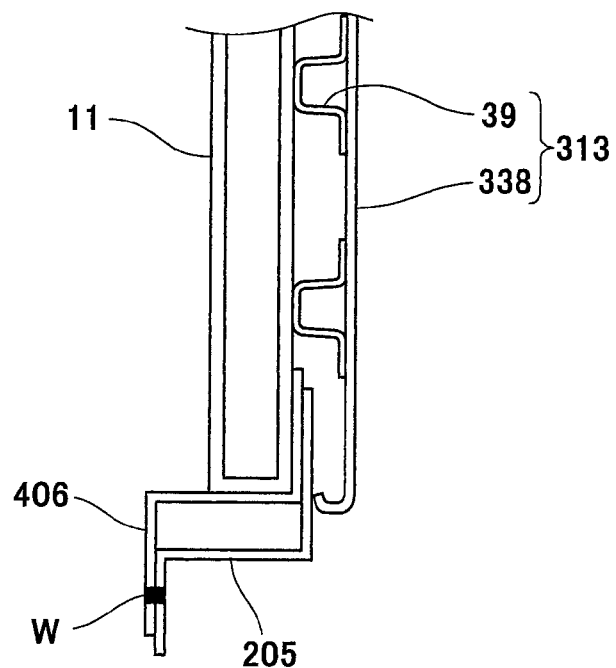
FIG. 12 is an enlarged longitudinal sectional view showing major components of the carbody according to a ninth embodiment.

FIG. 12 is an enlarged longitudinal sectional view showing major components of the carbody according to the ninth embodiment. As shown in FIG. 12, in the ninth embodiment, an upper end portion of a side sill 205 and an upper end portion of a door opening bracket 406 are located outside the first door pocket module 11 in the carbody width direction. The lower end of the wainscot panel module 313 is located lower than an upper end of the floor bodyshell (i.e., an upper end of the side sill 205 and an upper end of the door opening bracket 406) and outside the upper end of the floor bodyshell in the carbody width direction. Since the other configuration of the ninth embodiment is the same as the configuration of the first embodiment, an explanation thereof is omitted.

Tenth Embodiment

Figure 13:
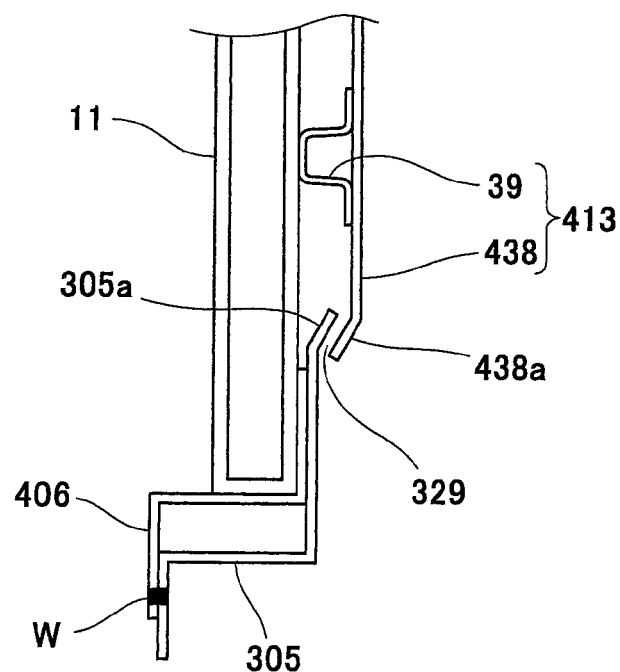
FIG. 13 is an enlarged longitudinal sectional view showing major components of the carbody according to a tenth embodiment.

FIG. 13 is an enlarged longitudinal sectional view showing major components of the carbody according to the tenth embodiment. As shown in FIG. 13, in the tenth embodiment, an upper end portion of a side sill 305 and the upper end portion of the door opening bracket 406 are located outside the first door pocket module 11 in the carbody width direction. An upper end portion 305a of the side sill 305 is inclined toward an outer side in the carbody width direction as the upper end portion 305a of the side sill 305 extends upward. A lower end portion 438a of a side outside plate 438 of a wainscot panel module 413 is inclined along the upper end portion 305a of the side sill 305. A gap 329 extending obliquely upward is formed between the lower end portion 438a of the side outside plate 438 and the upper end portion 305a of the side sill 305. With this, water which enters into the gap 329 between the wainscot panel module 413 and the side sill 329 can be discharged to the outside by an own weight of the water. Since the other configuration of the tenth embodiment is the same as the configuration of the first embodiment, an explanation thereof is omitted.

Eleventh Embodiment

Figure 14:
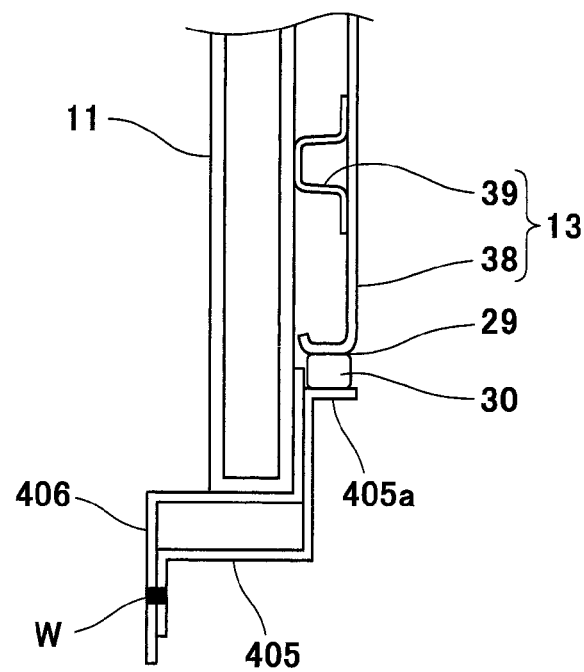
FIG. 14 is an enlarged longitudinal sectional view showing major components of the carbody according to an eleventh embodiment.

FIG. 14 is an enlarged longitudinal sectional view showing major components of the carbody according to the eleventh embodiment. As shown in FIG. 14, in the eleventh embodiment, an upper end portion of a side sill 405 and the upper end portion of the door opening bracket 406 is located outside the first door pocket module 11 in the carbody width direction, and an upper end portion 405a of the side sill 405 projects horizontally toward an outer side in the carbody width direction. Silicone or the like as the sealing member 30 is put into a gap between the lower end of the wainscot panel module 13 and the upper end portion 405a of the side sill 405 by coking. Since the other configuration of the eleventh embodiment is the same as the configuration of the first embodiment, an explanation thereof is omitted.

Twelfth Embodiment

Figure 15:
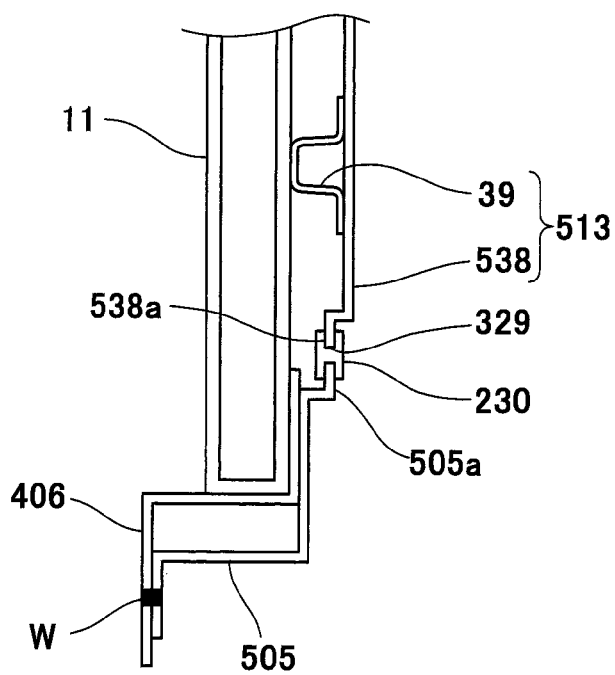
FIG. 15 is an enlarged longitudinal sectional view showing major components of the carbody according to a twelfth embodiment.

FIG. 15 is an enlarged longitudinal sectional view showing major components of the carbody according to the twelfth embodiment. As shown in FIG. 15, in the twelfth embodiment, an upper end portion of a side sill 505 and the upper end portion of the door opening bracket 406 are located outside the first door pocket module 11 in the carbody width direction. An upper end portion 505*a* of the side sill 505 and a lower end portion 538*a* of a side outside plate 538 of a wainscot panel module 513 oppose each other with the gap 329 between the upper end portion 505*a* and the lower end portion 538*a*. A sealing member 230 made of an elastic material is engaged with the upper end portion 505*a* of the side sill 505 and the lower end portion 538*a* of the side outside plate 558 to fill the gap 329. Since the other configuration of the twelfth embodiment is the same as the configuration of the first embodiment, an explanation thereof is omitted.

The present invention is not limited to the above embodiments, and modifications, additions, and eliminations may be made within the scope of the present invention. The above embodiments may be combined arbitrarily. For example, a part of components or methods in one embodiment may be applied to another embodiment. In the above embodiments, the wainscot panel module 13, the window modesty panel module 14, and the door modesty panel modules 18 and 22 are not fixed to the floor bodyshell 2 and the roof bodyshell 3. However, a part of the wainscot panel module 13, the window modesty panel module 14, and the door modesty panel modules 18 and 22 may be fixed to the floor bodyshell 2 or the roof bodyshell 3. The lower end portion of the wainscot panel module 13 is located lower than the upper end of the side sill 5*a* (side portion) of the floor bodyshell 2 and inside the upper end of the side sill 5*a* in the carbody width direction.

In the above embodiments, the lower end portion of the wainscot panel module 13 is in a non-joined state with respect to the floor bodyshell 2. However, the lower end portion of the wainscot panel module 13 is just required to be freer with respect to the floor bodyshell 2 than the lower end portions of the door pocket modules 11, 12, 17, and 21. For example, even if a part of the lower end portion of the wainscot panel module 13 is joined to the floor bodyshell 2, the amount of joining (such as a length of the joining or the number of joined portions) of the wainscot panel module 13 to the floor bodyshell 2 is just required to be smaller than the amount of joining of each of the door pocket modules 11, 12, 17, and 21 to the floor bodyshell 2 (a length of the wainscot panel module 13 in the carbody longitudinal direction is longer than a length of each of the door pocket modules 11, 12, 17, and 21). The same is true for the window modesty panel module 14 and the door modesty panel modules 18 and 22.

In the above embodiment, the door is a sliding door, and the door pocket which houses the door is included. However, when the door is a plug door, the door pocket may not be included.

INDUSTRIAL APPLICABILITY

As above, the carbody of the railcar according to the present invention has an excellent effect of being able to improve the efficiency of the assembly work of the carbody while maintaining the rigidity of the carbody, the assembly work being performed by joining the side modules to one another. Therefore, it is useful to widely apply the carbody according to the present invention to railcars which can achieve the significance of this effect.

REFERENCE SIGNS LIST

1 carbody
2 floor bodyshell
3 roof bodyshell
4 side bodyshell
5*a* side sill (longitudinal member)
6 door opening bracket
9 cantrail (longitudinal member)
11 first door pocket module (first module)
12 second door pocket module (second module)
13, 113 wainscot panel module (third module)
14 window modesty panel module (third module)
15 window opening
17 third door pocket module (second module, fourth module)
18, 22 door modesty panel module (third module)
19 first door opening
23 second door opening
29, 129, 229, 329 gap
30, 130, 230 sealing member
35 receiving member
36 seat member

The invention claimed is:

1. A carbody of a railcar,
the carbody comprising:
a first bodyshell constituted by a side bodyshell divided into a plurality of side modules in a carbody longitudinal direction; and
a second bodyshell constituted by a floor bodyshell or a roof bodyshell, an end portion of the side bodyshell being joined to the second bodyshell, the end portion being located at one side in a vertical direction,
the plurality of side modules including:
a first module;
a second module provided away from the first module in the carbody longitudinal direction; and
a third module extending between the first module and the second module in the carbody longitudinal direction and directly joined to the first module and the second module, a length of the third module in the carbody longitudinal direction being longer than each of a length of the first module in the carbody longitudinal direction and a length of the second module in the carbody longitudinal direction,
an end portion of the first module and an end portion of the second module opposing and being joined to the second bodyshell, the end portions of the first and second modules being located at the one side,
an end portion of a region of the third module opposing the second bodyshell, the region being located between the first module and the second module in a side view, the end portion of the region being located at the one side, the end portion of the region of the third module being freer with respect to the second bodyshell than the end portion of the first module and the end portion of the second module, and
the third module being supported by the second bodyshell through the first module and the second module.

2. The carbody according to claim 1, wherein an opening portion constituted by a window opening or a door opening is provided between the first module and the second module.

3. The carbody according to claim 2, wherein:
the first bodyshell is provided with the window opening as the opening portion, a first door opening provided at one side of the window opening in the carbody longitudinal direction, and a second door opening provided at the other side of the window opening in the carbody longitudinal direction;
the first module is provided between the first door opening and the window opening;

the second module is provided between the second door opening and the window opening; and the third module is provided under the window opening.

4. The carbody according to claim 3, wherein:
the first module is provided at one side of the first door opening in the carbody longitudinal direction so as to define the first door opening; and
the second module is provided at one side of the second door opening in the carbody longitudinal direction so as to define the second door opening, the one side of the second door opening is opposite to the one side of the first door opening in the carbody longitudinal direction.

5. The carbody according to claim 4, wherein:
the first module is a first door pocket module including a first door pocket that houses a door configured to open and close the first door opening; and
the second module is a second door pocket module including a second door pocket that houses a door configured to open and close the second door opening.

6. The carbody according to claim 4, wherein:
the plurality of side modules further includes a fourth module provided at the other side of the first door opening in the carbody longitudinal direction so as to define the first door opening, the first door opening being sandwiched between the fourth module and the first module in the carbody longitudinal direction;
the second bodyshell includes
a longitudinal member constituted by a side sill or a cantrail and extending in the carbody longitudinal direction at one side in a carbody width direction, and
a door opening bracket fixed to the longitudinal member; and
the door opening bracket includes a joint portion to which the first module is joined and a joint portion to which the fourth module is joined.

7. The carbody according to claim 3, wherein the third module is a wainscot panel module including a side outside plate located under the window opening.

8. The carbody according to claim 1, wherein the end portion of the region of the third module is in a non-joined state with respect to the second bodyshell, the region being located between the first module and the second module in the side view.

9. The carbody according to claim 1, wherein a gap is formed between at least a part of the end portion of the third module and the second bodyshell.

10. The carbody according to claim 9, wherein the end portion of the third module opposes the floor bodyshell and is located lower than an upper end of a side portion of the floor bodyshell and located at a lateral side of the upper end of the side portion in the carbody width direction.

11. The carbody according to claim 9, further comprising a sealing member inserted into the gap.

12. The carbody according to claim 1, wherein the third module further includes a receiving member, an interior part including a seat member being attached to the receiving member.

13. The carbody according to claim 2, wherein
the first bodyshell is provided with the window opening as the opening portion, a first door opening provided at one side of the window opening in the carbody longitudinal direction, and a second door opening provided at the other side of the window opening in the carbody longitudinal direction; and
the first, second and third modules are disposed between the first door opening and the second door opening.

14. The carbody according to claim 1, wherein
a window opening is provided between the first module and the second module;
the third module includes a wainscot panel module and a window modesty panel module; and
the window opening is a rectangular space surrounded by the first module, the second module, the wainscot panel module and the window modesty panel module.

15. A carbody of a railcar,
the carbody comprising:
a first bodyshell constituted by a side bodyshell divided into a plurality of side modules in a carbody longitudinal direction; and
a second bodyshell constituted by a floor bodyshell or a roof bodyshell, an end portion of the side bodyshell being joined to the second bodyshell, the end portion being located at one side in a vertical direction,
the plurality of side modules including:
a first module;
a second module provided away from the first module in the carbody longitudinal direction; and
a third module extending between the first module and the second module in the carbody longitudinal direction and joined to the first module and the second module, a length of the third module in the carbody longitudinal direction being longer than each of a length of the first module in the carbody longitudinal direction and a length of the second module in the carbody longitudinal direction,
an end portion of the first module and an end portion of the second module opposing and being joined to the second bodyshell, the end portions of the first and second modules being located at the one side,
an end portion of a region of the third module opposing the second bodyshell, the region being located between the first module and the second module in a side view, the end portion of the region being located at the one side, the end portion of the region of the third module being freer with respect to the second bodyshell than the end portion of the first module and the end portion of the second module,
the third module being supported by the second bodyshell through the first module and the second module, and
the first, second and third modules being disposed between two immediately-neighboring door openings.

16. A carbody of a railcar,
the carbody comprising:
a first bodyshell constituted by a side bodyshell divided into a plurality of side modules in a carbody longitudinal direction; and
a second bodyshell constituted by a floor bodyshell or a roof bodyshell, an end portion of the side bodyshell being joined to the second bodyshell, the end portion being located at one side in a vertical direction,
the plurality of side modules including:
a first module;
a second module provided away from the first module in the carbody longitudinal direction; and
a third module extending between the first module and the second module in the carbody longitudinal direction and joined to the first module and the second module, a length of the third module in the carbody longitudinal direction being longer than each of a length of the first module in the carbody longitudinal direction and a length of the second module in the carbody longitudinal direction, an end portion of the first module and an end portion of the second module opposing and being joined to the second bodyshell, the end portions of the first and second modules being located at the one side, an end portion of a region of the third module opposing the second bodyshell, the region being located between the first module and the second module in a side view, the end portion of the region being located at the one side, the end portion of the region of the third module being freer with respect to the second bodyshell than the end portion of the first module and the end portion of the second module, the third module being supported by the second bodyshell through the first module and the second module, and the end portion of the region of the third module being in a non-joined state with respect to the second bodyshell or an amount of joining of the end portion of the region of the third module to the second bodyshell being smaller than an amount of joining of each of the end portion of the first module and the end portion of the second module.

* * * * *